United States Patent [19]

Guo et al.

[11] Patent Number: 5,299,192

[45] Date of Patent: Mar. 29, 1994

[54] DIGITAL FILTER-TYPE FREQUENCY DEMULTIPLEXING DEVICE

[75] Inventors: Xiao Y. Guo, Toulouse; Gérard Maral, Goyrans, both of France

[73] Assignee: France Telecom, Paris, France

[21] Appl. No.: 993,279

[22] Filed: Dec. 18, 1992

[30] Foreign Application Priority Data

Dec. 20, 1991 [FR] France .................. 91-15931

[51] Int. Cl.$^5$ .............................................. H04J 1/02
[52] U.S. Cl. ...................................... 370/70; 370/50
[58] Field of Search ............... 370/69.1, 70, 123, 50, 370/120; 364/724.1, 576; 324/76.21, 76.24, 76.28, 76.44, 76.59

[56] References Cited

U.S. PATENT DOCUMENTS

| | | | |
|---|---|---|---|
| 4,131,766 | 12/1978 | Narasimha | 370/70 |
| 4,358,733 | 11/1982 | Hanahara | 324/76.28 |
| 4,393,456 | 7/1983 | Marshall | 370/70 |
| 4,412,325 | 10/1983 | Molo | 370/70 |
| 4,785,447 | 11/1988 | Ichiyoshi | 370/70 |
| 4,961,160 | 10/1990 | Sato et al. | 364/724.01 |

OTHER PUBLICATIONS

"Alternatives for On-Board Digital Multicarrier Demodulation", by Enrico Del Re et al., International Journal of Satellite Communications, vol. 6, pp. 267-281, 1988.

"Multi-Carrier Demodulators for On-Board Processing Satellites", by W. H. Yim et al, International Journal of Satellite Communications, vol. 6, pp. 243-251, 1988.

Primary Examiner—Douglas W. Olms
Assistant Examiner—Chau T. Nguyen
Attorney, Agent, or Firm—Lowe, Price, LeBlanc & Becker

[57] ABSTRACT

After sampling a multicarrier signal, groups of multiplex modulated carriers with identical bandwidths are separated by group filters. Clock frequencies of the carriers are then reduced by decimators depending on their respective bandwidths. To separate each of the modulated carriers in each of the groups, a polyphase network architecture is combined with a stage of delay lines for processing separate groups of multiplexed modulated carriers with identical bandwidth by programming a Fourier transform complex multiplying circuit. The demultiplexing devices is programmed to process evolutive traffics of groups of multiplexed carriers by a switching stage linking outputs of the decimation filters to inputs of the delay line stage.

6 Claims, 5 Drawing Sheets

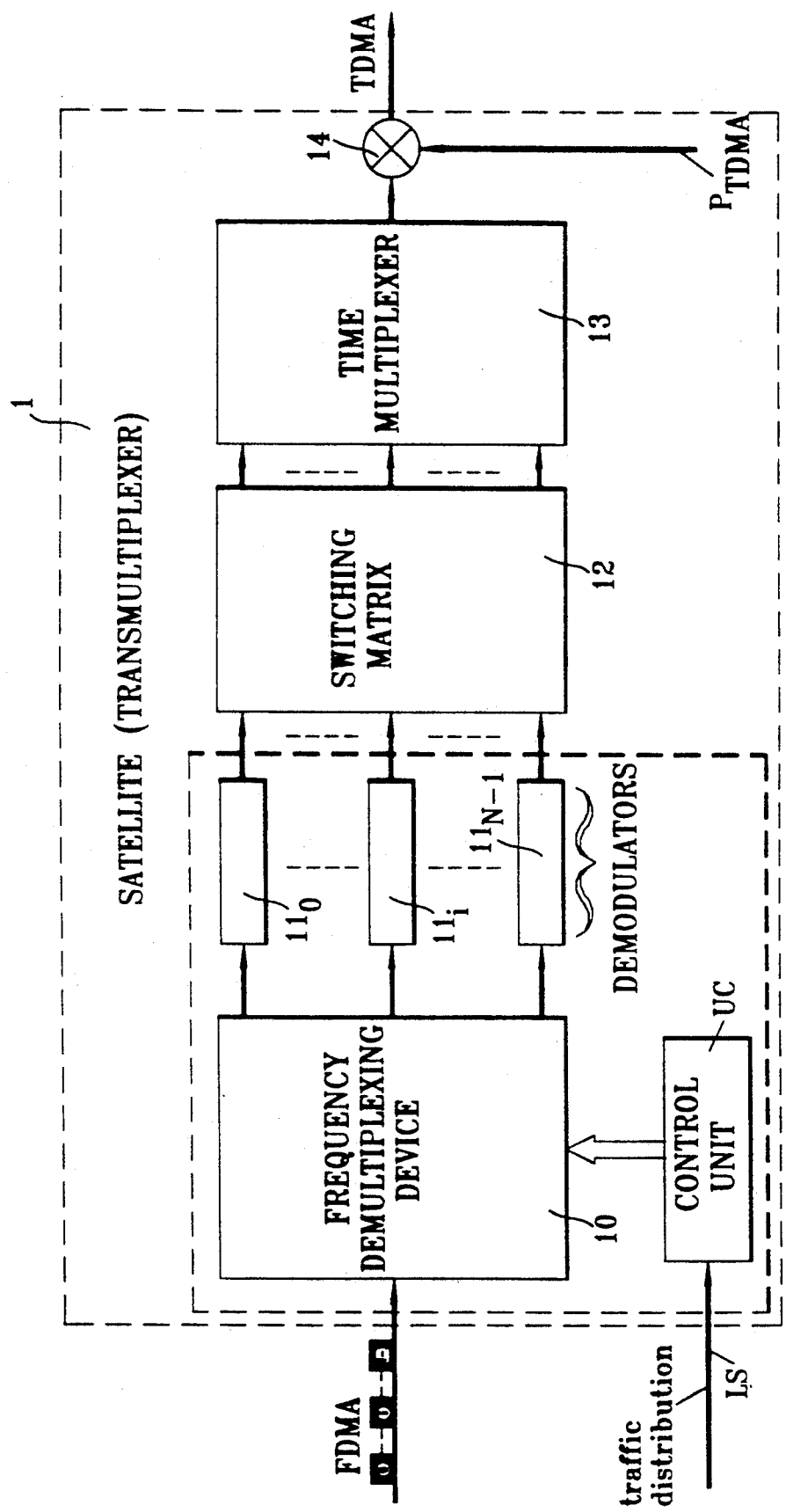

DIGITAL FILTER-TYPE FREQUENCY DEMULTIPLEXING DEVICE

BACKGROUND OF THE INVENTION

1. Field of the Invention

This invention relates generally to frequency multiplexing/demultiplexing through digital processing.

2. Description of the Prior Art

The first frequency multiplexing/demultiplexing devices through digital processing were developed within transmultiplexers to solve the problem of data transfers between multiplex-ways of different types within the telephone network. For example, such a transmultiplexer sets up a connection between a secondary group (SG) multiplex-way consisting of 60 frequency multiplexed analog telephone channels, with 4 KHz bandwidth each one, and two primary MIC multiplex-ways (TN1) at 2,048 Mbits/sec. Thus, very schematically, the transmultiplexers provide a conversion between frequency division multiplex-way (FDM) and time division multiplex-way (TDM).

In the field of satellite telecommunications, this transmultiplexing technique has proved to be especially advantageous in meeting two conditions in view of optimum implementation of satellite networks. Firstly, the frequency division multiple access (FDMA) for up-links set up from earth stations to the satellite has proved to be a promising technique in that it reduces the transmission power needed and the dimensions of the transmitter antennas for the earth stations, thus offering greater flexibility for the station installation sites. Secondly, concerning the down-links set up from the satellite to the earth stations, the FDMA technique is recommended so as not to generate intermodulation noise when several carriers modulated by the signals to be transmitted are transmitted by satellite. This intermodulation noise increases depending on the number of carriers. A single carrier modulated by FDMA digital frame inhibits this intermodulation problem.

The satellites employed to make such a conversion between FDMA and TDMA techniques are commonly known as regenerative satellites given that they "regenerate" the component signals received in the form of a multiplex channel as a function of the individual frequency bands of the component signals.

As compared to a network of satellite microstations (VSAT for "Very Small Aperture Terminal") in which the respective links between the microstations and a central station and the central station and the microstations are provided by a TDMA carrier and a TDM carrier, the transmultiplexing technique on board regenerative satellites reduces by half the transmission time between two stations given that the data transfers between stations are made directly and not via a central station.

Despite all the aforesaid advantages resulting from the use of regenerative satellites, the satellite operators hesitate somewhat to use them.

This results in two requirements which must be satisfied in view of optimum use of the total bandwidth allocated to the network and which are antagonistic according to the prior art:

the transmultiplexer must be programmable "simply" from the ground via a dedicated channel, so as to be configured as a function of the evolution of the traffic in the satellite network, and the transmultiplexer must receive frequency multiplexed signals with different bandwidths.

The central unit of the transmultiplexer is a frequency demultiplexing device which is programmed from the ground. According to the prior art, different demultiplexer structures, on a digital filter base, have been proposed. The following can be chiefly singled out:

the embodiments carrying out individual processings of the channels, which offer the drawback of needing highly complex and costly material embodiments when the number of frequency multiplexed carriers increases and which, moreover, necessitate unwieldy programming;

the "fast Fourier transform" embodiments which offer the drawback of only being really efficient when there is a large number of carriers, given that if this is not the case, they need long processing times as compared to the number of carriers; and the embodiments with polyphase networks consisting of delay lines and digital filters which, according to the prior art, prevent the processing of frequency multiplexed signals with different bandwidths.

OBJECT OF THE INVENTION

The main object of this invention is to provide a demultiplexing device using polyphase networks which are capable of being used to restore initially frequency multiplexed channels whose frequency bandwidths are different, and therefore which is preferably adaptable to the evolution in traffic expressed in modifications to the channels both in number and bandwidth.

SUMMARY OF THE INVENTION

Accordingly, a demultiplexing device embodying the invention demultiplexes frequency multiplexed channels in a multicarrier sampled signal with a predetermined useful frequency bandwidth. The channels are defined by modulated carriers comprised within the useful band and by frequency bandwidths juxtaposed in the useful band. The bandwidths of the channels are integer sub-multiples of a maximum channel bandwidth which is itself a sub-multiple of the useful band, and are integer multiples of a minimum channel bandwidth.

The demultiplexing device consists, in a manner similar to the known polyphase network devices, of parallel sets in a predetermined number equal to a ratio between the useful bandwidth and the minimum channel bandwidth, each of the sets including a delay line and a digital filter in series, and Fourier transform digital processing means connected to outputs of said filters for restoring said channels individually, each of said filters being deduced from a digital low-pass filter filtering in said minimum channel band.

Nevertheless the known polyphase network devices only process channels with identical bandwidths. In other words the minimum and maximum bandwidths are equal to the bandwidth of all the channels, and each delay line and digital filter set is allocated to the processing of a channel.

According to the invention, the demultiplexing device further comprises:

several digital filtering and decimation means for respectively separating the channels in the multicarrier sampled signal into channel groups in a predetermined number, each of the channel groups comprising juxtaposed bands of all the channels which have the same bandwidth which is different from the bandwidths of the other channels, several parallel delay lines in a predetermined number equal to a ratio between the useful frequency bandwidth and the maximum channel bandwidth, each of the channel groups being delayed by a number of respective parallel delay lines equal to the nearest upper integer of a ratio between a bandwidth of said each of the channel groups and the maximum channel bandwidth, and several parallel identical polyphase networks respectively connected to outputs of said delay lines and each comprising several of said parallel delay-line and digital-filter sets in a predetermined number equal to a ratio between the maximum and minimum channel bandwidths.

Thanks to the arrangement of the delay line and digital filter sets into independent and identical polyphase networks, these are capable of processing channels whose bandwidths are different and comprised between the minimum and maximum bandwidths. The routing of the channels towards these polyphase networks is obtained as a function of the features of the channels within the groups, number and bandwidths of the channels within each group, to which are notably adapted the filtering, decimation and delay features of the means filtering and decimation and delay lines preceding the polyphase networks as also the matrix features in the Fourier transform means for processing.

These adaptations in the demultiplexing device as embodied by the invention can be expressed by the following features:

the filtering and decimation means separating a respective channel group in said multicarrier signal comprise a digital filter which has a bandwidth equal to the bandwidth of the respective channel group and is series-connected with a decimator with a reduction ratio equal to a ratio between the bandwidth of the respective channel group and the useful frequency bandwidth;

the parallel delay lines delaying the respective channel group impose delays respectively in proportion to integer multiples as from zero of a ratio between the useful frequency bandwidth and the bandwidth of the respective channel group;

1. the delay lines included in each of the polyphase networks impose delays respectively in proportion of integer multiples as from zero of the ratio between said maximum and minimum channel bandwidths;

the Fourier transform digital processing means comprise, for each channel group, several Fourier transform coefficient square matrix means in number equal to a ratio between the channel bandwidth of said each channel group and the minimum channel bandwidth, a dimension of each of said matrix means being equal to a number of channels in said each channel group.

From the various features above it is possible to adapt the demultiplexing device to the evolution in the traffic. In other words, the demultiplexing device is preferably programmable. In this case the digital filtering and decimation means, the parallel delay lines and the digital processing means are programmable by means of control means receiving characteristics relating to predetermined number and distribution of the channel groups within said useful frequency bandwidth and numbers of channels in the channel groups, and the demultiplexing device comprises several switching means respectively connected to outputs of the digital filtering and decimation means and controlled by the control means for connecting selectively the digital filtering and decimation means to the parallel delay lines as a function of the distribution of the channel groups and the numbers of channels in said channel groups.

BRIEF DESCRIPTION OF THE DRAWINGS

Further features and advantages of the present invention will appear more clearly from the following description with reference to the corresponding accompanying drawings in which:

FIG. 2 is a block diagram of a known transmultiplexer included in the regenerative satellite;

Referring to FIG. 1, a regenerative satellite network typically includes a satellite 1, N earth stations $S_O$ to $S_{N-1}$ and a configuration station CS to program satellite 1 from the ground.

The configuration station CS performs programming functions of satellite 1 during evolutions or modifications of the traffic between earth stations $S_O$ to $S_{N-1}$. Typically the link set up between the configuration stations CS and the satellite is a dedicated link SL transmitting all the programming data produced by the configuration station CS.

Figure 1:
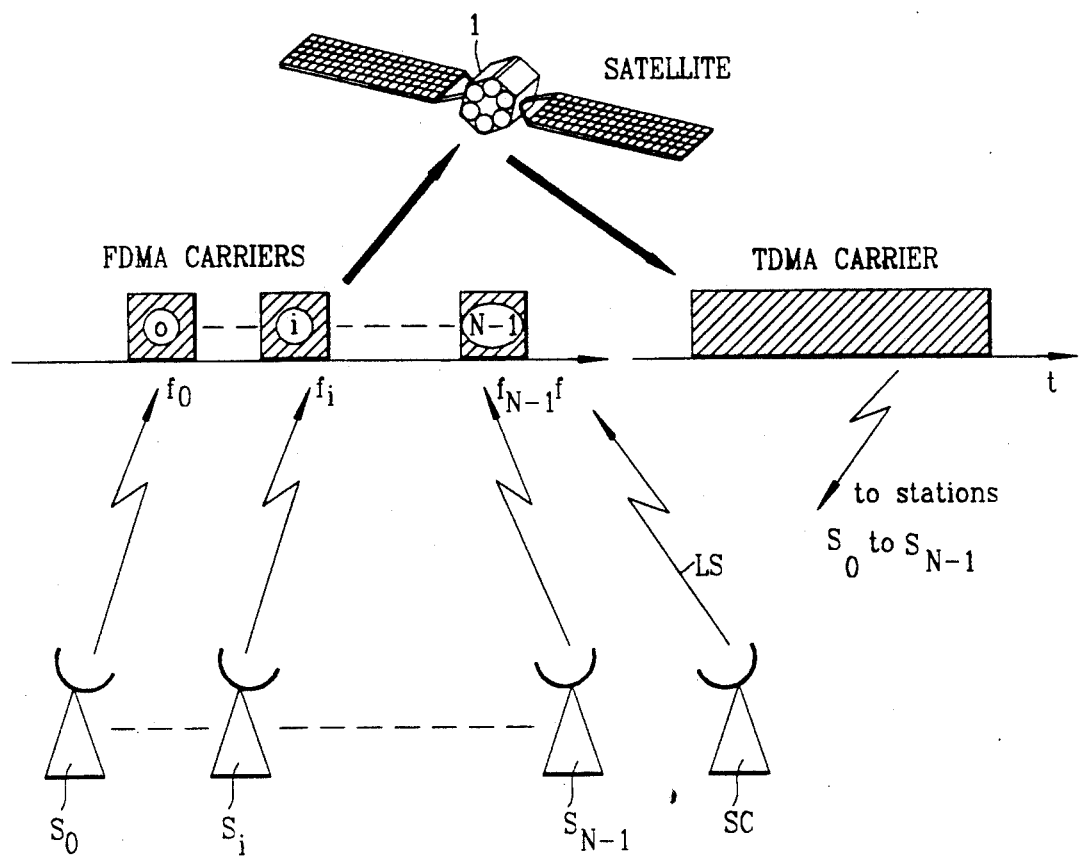
FIG. 1 shows schematically a known regenerative satellite network.

The earth stations $S_i$, where i is an integer lying between 0 and $N-1$, transmit to satellite 1, through up-links, respective frequency multiplexed modulated carriers in a frequency range having a given total bandwidth in the region of 1 gigahertz. The bandwidths allocated to the different carriers are of few megahertz (such as 6 MHz). This frequency multiplexing is shown schematically on FIG. 1. The satellite receiving these multiplexed modulated carriers performs transmultiplexing functions to make a conversion between the FDMA (frequency division multiple access) format featuring the up-links and a TDM (time division multiplexing) format of the down-links between satellite 1 and stations $S_O$ to $S_{N-1}$. Digital data transmitted respectively by the frequency multiplexed modulated carriers on up-links are thus multiplexed in time on down-links. The stations $S_i$, on receive, are allotted respectively to time channels of the down-links in order to recover the data transmitted by carriers of the up-links.

FIG. 2 is a block diagram of a known embodiment of a transmultiplexer on board satellite The transmultiplexer includes, cascade-wise, a frequency demultiplexing device 10, N demodulators $11_0$ to $11_{N-1}$, a switching matrix 12, a time multiplexer and a modulator 14. The N modulated carriers transmitted by stations $S_O$ to $S_{N-1}$ which are frequency multiplexed are received by an antenna of satellite 1 via the up-links and are applied to an input terminal of demultiplexing device 10. This latter demultiplexes the N carriers which are transposed in the frequency domain into base-band to be reproduced on N respective outputs of the demultiplexing device. These N base-band modulated carriers are applied respectively to the inputs of the N demodulators $11_0$ to $11_{N-1}$ to be demodulated so as to recover the digital data modulating the carriers. Switching matrix 12 allocates the data thus recovered to time channels. These different channels are multiplexed by time multiplexer 13 so as to be transmitted, after modulating a single carrier PTDMA in modulator 14, on down-links towards the N stations.

Figure 3:
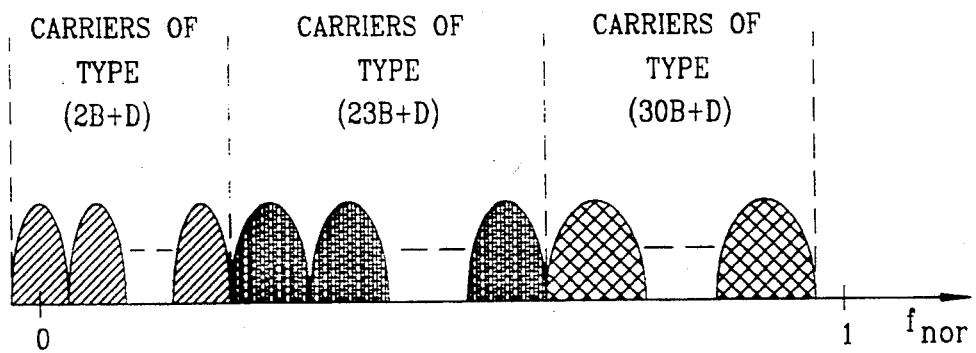
FIG. 3 is a frequency chart, frequency multiplexed ISDN basic access and primary access signals.

As shown in FIG. 3, such a regenerative satellite network can concern a Integrated Services Digital Network offering for example base accesses at 144 Kbit/s (2B+D) and primary accesses at 1,544 Kbit/s (23B+D) and/or 2,048 Kbit/s (30B+D). The carriers modulated by the different digital signals at rates of 144 Kbit/s, 1,544 Kbit/s and/or 2,048 Kbit/s are frequency multiplexed in the frequency band offered to the uplinks, and are featured by bandwidths which are different depending on the rates.

Figure 4:
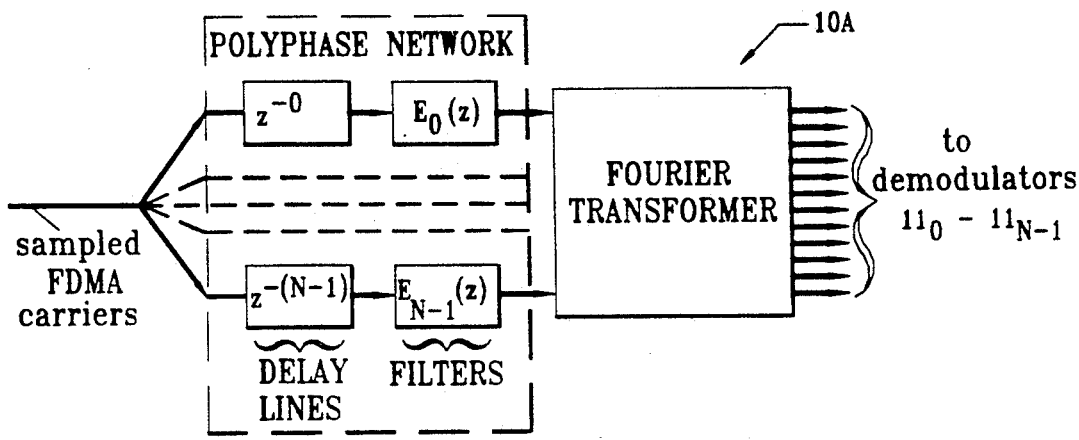
FIGS. 4 and 5 are block diagrams of two digital frequency demultiplexing devices according to the prior art, respectively.
Figure 5:
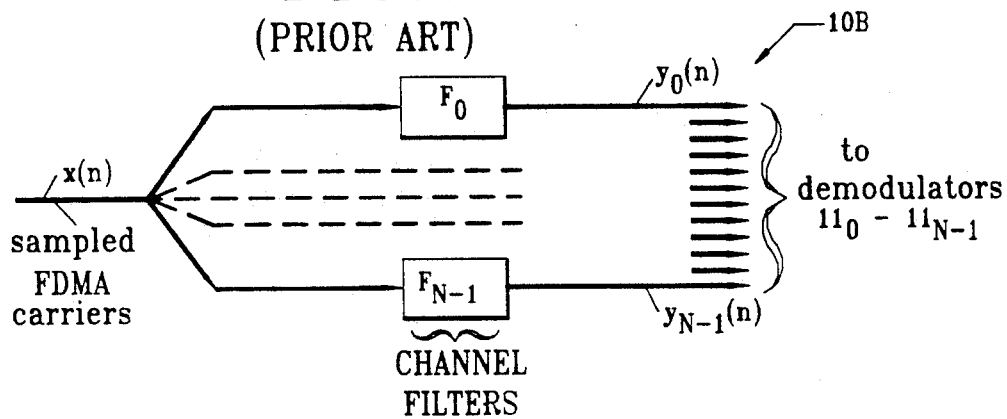

Two known digital demultiplexing devices 10A and 10B, according to the prior art, are now shown in reference to Figs. 4 and 5.

The first demultiplexing device 10A, illustrated in FIG. 4, concerns a frequency demultiplexer comprising a polyphase network and a Fourier transform device and refers to the article by Enrico del Re and Romano Fantacci published in "INTERNATIONAL JOURNAL OF SATELLITE COMMUNICATIONS", vol. 6, pp 267–281, March 1988. The polyphase network consists of N parallel branches. Each n rank branch, n being an integer of between 0 and N−1, includes in series a delay line with an impedance written in z transform form, $z^{-n}$, and a filter with impedance noted $E_n(z)$. The multiplexed modulated carriers are applied, after sampling, to each of the branches whose respective outputs are applied to inputs of the Fourier transform device with N inputs and N outputs.

The schematic operation of this first demultiplexing device 10A consists in a translation into the frequency domain of an elementary low-pass filter having a shape with a bandwidth equal to the identical bandwidths of the modulated carriers. Thus the functional drawback of this technique lies in the fact that the frequency multiplexed modulated carriers must have the same bandwidth. The first polyphase network demultiplexing device operates as follows:

Take $$H_0(z) = \sum_{m=0}^{M-1} h(m)z^{-m},$$

the transfer function, in z transform form, of an elementary finite pulse response-type low-pass filter. $H_0(z)$ is written:

$$H_0(z) = [h(0)z^{-0} + h(1)Z^{-1} + h(2)z^{-2} + h(3)z^{-3} + \ldots + h(M)z^{-M+1}],$$

i.e., breaking it down into N sequences:

$$H_0(z) = \sum_{k=0}^{K} h(KN)z^{-KN} + \sum_{k=0}^{K} h(kN+1)z^{-kN-1} + \ldots +$$

-continued $$\sum_{k=0}^{K} h(kN+N-1)z^{-kN-N+1}$$

which is written:

$$H_0(z) = z^{-0}\left(\sum_{k=0}^{K} h(kN)z^{-kN}\right) +$$

$$z^{-1}\left(\sum_{k=0}^{K} h(kN+1)z^{-kN-1}\right) + \ldots +$$

$$z^{-N+1}\left(\sum_{k=0}^{K} h(kN+N-1)z^{-kN}\right), \text{ i.e.:}$$

$$H_0(z) = z^{-0}[E_0(z^{-kN})] + z^{-1}[E_1(z^{-kN})] + \ldots +$$

$$z^{-N+1}[E_{N-1}(z^{-kN})],$$

stating that $$E_n(z^{-kn}) = \sum_{k=0}^{K} h(kN+n)z^{-kN}.$$

This equation corresponds to a polyphase representation with N components.

Take N filters $H_n(z)$, n varying from 0 to (N−1) which respectively filter the N frequency multiplexed modulated carriers with identical bandwidths covering a total frequency band of $\Delta f_T/2$. As from $H_0(z)$, the transfer function of the elementary low-pass filter, through a frequency translation of (n $\Delta f_T/2N$), a $n^{th}$ pass-band filter can be deduced which has a shape coinciding respectively with the frequency band attributed to the $n^{th}$ modulated carrier, and which corresponds to a change in the variable z by z exp[j2πn/N], where exp designates the complex exponential operator. The transfer function of the $n^{th}$ filter $H_n(z)$ frequency "shifted" can then be written as:

$$H_n(z) = H_0[z \exp(j2\pi n/N)]$$

By introducing the breakdown into N polyphase components in the above relation, one obtains:

$$H_n(z) = \sum_{k=0}^{N-1} z^{-k} \exp[-j2\pi kn/N] E_k(z^{-kN})$$

Thus for the N filters, the relation is written:

$$\begin{pmatrix} H_0 & (z) \\ H_1 & (z) \\ \vdots \\ H_{N-1} & (z) \end{pmatrix} = \begin{pmatrix} 1 & 1 & \ldots & 1 \\ 1 & V & \ldots & V^{(N-1)} \\ \vdots & & & \vdots \\ 1 & V^{(N-1)} & \ldots & V^{(N-1)(N-1)} \end{pmatrix}.$$

-continued $$\begin{pmatrix} E_0(z^{-kN}) \\ z^{-1} E_1(z^{-kN}) \\ \vdots \\ z^{-(N-1)}E_{N-1}(z^{-kN}) \end{pmatrix}$$

in which V is equal to exp $[-j2\pi/N]$.

The central operator matrix in the above equation represents a Fourier transform whereas filters $E_0(z^{-nN})$, $z^{-1}E_1(z^{-kN})$, ... $z^{-(N-1)} E_{N-1}(z^{-kN})$ feature cascadings of delay lines having transfer functions $z^{-0}$, $z^{-1}$, $z^{-N+1}$ respectively with filters having transfer functions $E_0(z^{-nN})$, $E_1(z^{-nN})$, $E_{N-1}(z^{-nN})$. These considerations condition the embodiment of demultiplexing device 10A shown in FIG. 4.

The second embodiment of a demultiplexing device 10B according to the prior art is now shown referring to FIG. 5 and refers to the article by W. H. YIM et al entitled "Multicarrier demodulators for on-board processing satellites" published in the INTERNATIONAL JOURNAL OF SATELLITE COMMUNICATIONS, vol. 6, pp. 243-251 (1988). Typically, two methods are proposed for this so-called "per channel" approach. The first method consists in a frequency shifting of respective multiplexed modulated carriers so as to transpose them into base-band, then in a low-pass filtering. The second and equivalent method consists in using pass-band filters having shapes frequency-shifted between them and deduced from one elementary pass-band filter. The block diagram of the demultiplexer in FIG. 5 shows a plurality of branches each including a channel filter respectively.

According to the first of the aforesaid methods, it is assumed that the transfer function of a low-pass filter $h_i(z)$ to filter a modulated carrier of a given bandwidth is written in the form of z transform:

$$h_i(z) = \sum_{n=0}^{N-1} h(n)z^{-n}$$

For a filter $F_i$, i being an integer of between 0 and (N−1) in a given $i^{th}$ branch, a first digital processing consists in shifting in base-band the carrier associated to the $i^{th}$ channel. Let us call x(k) the sampled digital incoming sequence of the multiplexed modulated carriers. This first processing consists in producing, as from sequence x(k), the sequence:

$$x_i(k)=x(k)\exp(-j.\omega_i kM)$$

in which exp designates the complex exponential operator, $\omega i$ is the angular centre frequency of the $i^{th}$ channel, and M is a decimation factor. A second digital processing then consists in low-pass filtering this sequence $x_i(k)$, for an $i^{th}$ channel of given bandwidth. The low-pass filter $h_i(z)$ performs this processing.

Thus for a $i^{th}$ channel, the digital sequence of the carrier $Y_i(k)$, base-band demultiplexed, is written:

$$Y_i(k) = \sum_{n=0}^{N-1} h(n)x(kM-n).e^{-j\omega i(kM-n)}.$$

Concerning the second method relating to the demultiplexer in FIG. 5, the proposal is to use for a $i^{th}$ branch a pass-band filter with a z transfer function which is obtained as from the z transfer function of a low-pass filter, being written:

$$h(z) = \sum_{k=0}^{N-1} h(n).z^{-n}$$

A result similar to the result obtained with the first method is then carried out.

DESCRIPTION OF THE PREFERRED EMBODIMENT

Figure 6:
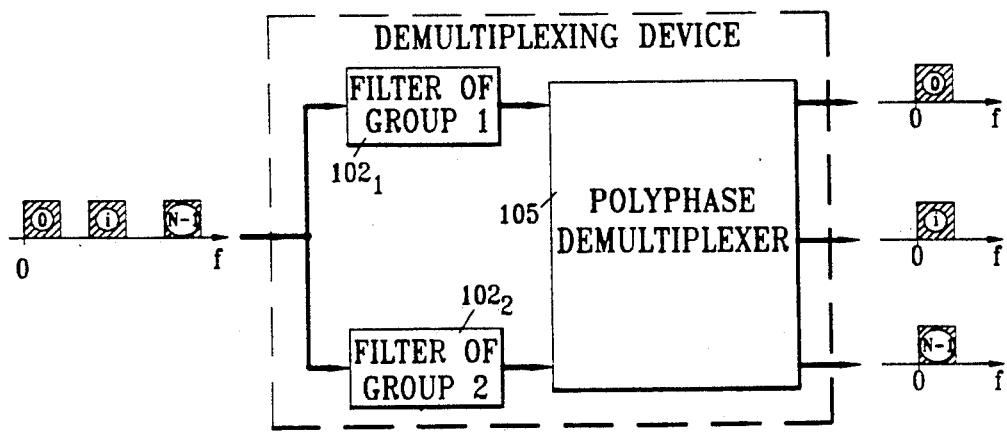
FIG. 6 is a schematic block diagram of a programmable frequency demultiplexing device, as embodied by the invention.

FIG. 6 shows a functional schematic block diagram of a demultiplexing device 10 according to the invention.

Frequency multiplexed modulated carriers relating to channels with different bandwidths are applied to an input of a first filtering stage comprising two filters, of the aforesaid "per-channel filter" type, whose respective outputs are applied to a polyphase demultiplexer 105 whose task is substantially similar to that indicated initially in the description of the prior art.

It should be observed that in the embodiment shown in FIG. 6, the number of groups each comprising modulated carrier channels with identical bandwidths is equal to 2. An extension to any number of groups each including channels of identical bandwidths also comes within the scope of the invention, by adding circuits similar to those associated to one of the groups of channels defined below for two operating modes of a programmable filter demultiplexing device as embodied by the invention. The two operating mode shown in reference to Figs. 7A and 8A also concern the case where two groups of modulated carriers of respective identical bandwidths are frequency multiplexed.

In view of simplifying the description it is also assumed that modulated carrier channels of one of the groups, said to be GROUP 1, have frequency bands $f_1$ four times narrower than the frequency bands $f_2$ of the channels of the other groups, said to be GROUP 2. The bandwidths $f_1$ and $f_2$ are here considered as being equal to the minimum and maximum bandwidths of the frequency multiplexed channels that the frequency multiplexing device is capable of processing. Band $f_1$ is an integer sub-multiple of the useful frequency band $f_u$ i.e. typically $f_1=f_u/16$ and also an integer sub-multiple of band $f_2$ i.e. $f_1=f_2/4$. Nevertheless the demultiplexing device can be used in other applications such as the ISDN network for base-band accesses (144 Kbit/s) and primary accesses (1,544 Kbit/s and/or 2,048 Kbit/s), in which the ratios between bandwidths of the channels are different from four, bandwidths of said accesses being given by $f_1$, $f_2=11f_1$ and $f_3=15f_1$.

Figure 7A:
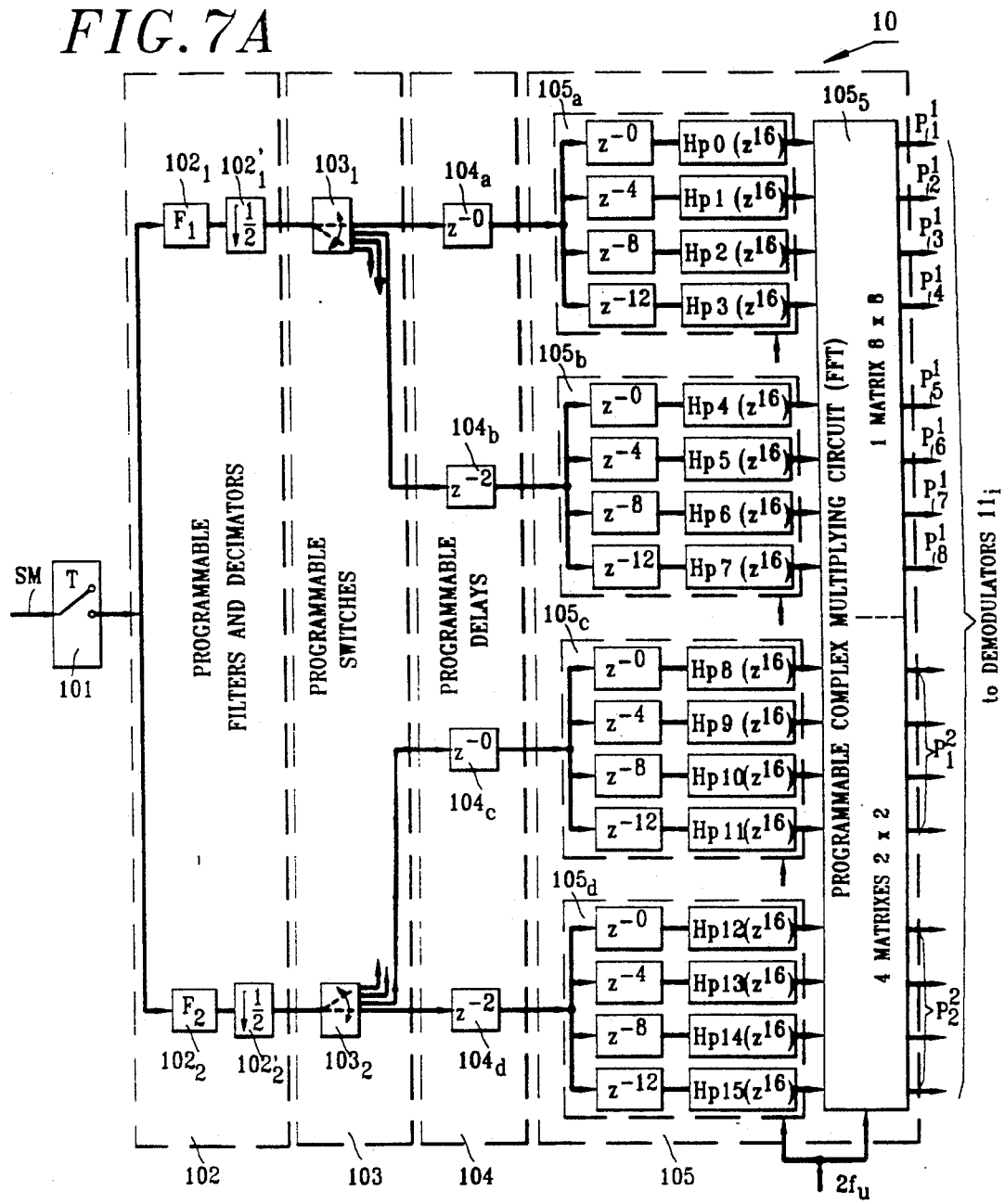
FIGS. 7A and 7B show respectively a first operating mode of the programmable demultiplexing device embodying the invention and a frequency image of a corresponding up-links traffic.

Referring to FIG. 7A, the frequency demultiplexing device 10 embodying the invention comprises a stage 102 with two filters $102_1$ and $102_2$ followed by two decimators $102_1'$ and $102_2'$ for two respective groups of channels with identical bandwidths, a stage 103 of two interconnection switching circuits $103_1$ and $103_2$ each with four outputs, a stage 104 of delay lines $104a$, $104b$, $104c$ and $104d$, a stage 105 including four polyphase networks $105_a$, $105_b$, $105_c$ and $105_d$ and a complex multiplying circuit $105_5$ (Fourier transform). The stages are placed cascade-wise according to the aforesaid order of enumeration, the filters of group $102_1$ and $102_2$ receive, in sampled form, the frequency multiplexed modulated carriers, and the base-band demultiplexed modulated carriers are produced at outputs of the complex multiplying circuit $105_5$.

Figure 7B:
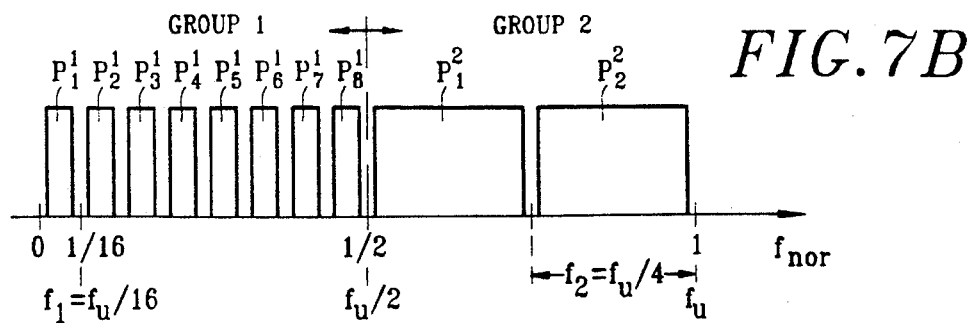

The first operating mode of the demultiplexing device shown in FIG. 7A results from an up-link traffic shown frequentially in FIG. 7B. As indicated in this FIG. 7B, the total useful frequency band $f_u$ allocated to the up-links is also indicated, for purposes of simplification, in a normalized form $f_{nor}$, and the frequency multiplexed modulated channel carriers are gathered into two groups depending on their bandwidth. Eight modulated carriers can be singled out P1/1 to P$\frac{1}{2}$ in a first group and two modulated carriers P2/1 to P2/2 in the second group. It is recalled that the channels in the second group are assumed, in this operating mode, to each have a bandwidth $f_2$ four times greater than the width of band $f_1$ of each of the channels in a first group i.e. in all $8f_1 + 2f_2 = f_u$.

The demultiplexing device 10 embodying the invention is preceded by a sampler 101 which receives the up-links multicarrier signal SM and samples the $(8+2) = 10$ frequency multiplexed modulated carriers, at an initial frequency 1/T to produce samples of the multicarrier signal. The frequency multiplexed modulated carriers thus sampled are applied to inputs of the two filters $102_1$ and $102_2$ of stage 102. Typically these filters, as described according to the prior art, comprise, among other things, pass-band filters or elementary low-pass filters. Their respective functions are to filter the two groups of carriers with identical bandwidths. Thus filter $102_1$ is allotted to GROUP 1 and filters all the carriers of this group, while filter $102_2$ filters the modulated carriers of the second group GROUP 2. Decimators $102_1'$ and $102_2'$, linked in series respectively with filters $102_1$ and $102_2$, reduce the frequency of the signals issued from filters $102_1$ and $102_2$. In fact, it is possible to reduce the initial sampling frequency respectively for each group of carriers GROUP 1 and GROUP 2 without affecting the respective multiplexed modulated carriers (Shannon's Theorem). This reduction by two of the frequency of the signals at the outputs of filters $102_1$ and $102_2$ is equivalent to a reduction by two of the number of samples at output of each filter, which preserves the number of samples and hence the total frequency band $f_u$ of the multicarrier incoming signal SM, at output of stage 102. The decimations contribute to reducing the necessary computation capacities, notably within the complex multiplying circuit $105_5$. The decimation factors in the decimation filters $102_1'$ and $102_2'$ are thus equal to $\frac{1}{2}$.

Before presenting stages 103 and 104, stage 105 consisting of polyphase networks $105_a$ to $105_d$ and the complex multiplying circuit $105_5$ is now described.

The four polyphase networks $105_a$ to $105_d$ each consist of four branches in-parallel. Each branch comprises in series a delay line and an elementary digital filter whose z transform Hp0 to Hp15 is written in a 16 degree z polynomial. The respective outputs of the sixteen digital filters are applied to the inputs of the complex multiplying circuit for fast Fourier transform (FFT) $105_5$. The demultiplexed modulated carriers of each group in base-band are produced on respective outputs of circuit $105_5$. Degree 16 of the z polynomials relating to the digital filters in the polyphase networks is induced by the fact, in accordance with the description of the prior art, that NP=16 modulated carriers of GROUP 1, i.e. NP=16 carriers with a minimum bandwidth $f_1$ forming a set of carriers included in the total predetermined frequency band $f_u$ of the incoming signal, can be demultiplexed. The elementary low-pass filter to deduce each of the filters Hp0 to Hp15 thus has a bandwidth equal to the minimum bandwidth $f_1$ of channels that the multicarrier incoming signal SM is capable of supporting.

Nevertheless, according to the invention, the digital delay lines placed upline of the respective digital filters do not possess z transforms varying successively from $z^{-0}$ to $z^{-15}$. This difference in comparison with the polyphase networks according to the prior art, is indicated below.

The polyphase network stage 105 demultiplexes both the modulated carriers of GROUP 1 and modulated carriers of GROUP 2 which do not correspond to channels with equal bandwidths. This demultiplexing would not be possible with only the use of a single polyphase network. For this purpose the stage 104 of delay lines comprises, according to the preferred operating modes illustrated, four delay lines $104_a$, $104_b$, $104_c$ and $104_d$ whose respective outputs are applied to inputs of polyphase networks $105_a$ and $105_d$. According to this preferred operating mode, the four delay lines in each of the polyphase networks possess z transforms that are written respectively $z^{-0}$, $z^{-4}$, $z^{-8}$ and $z^{-12}$. In these conditions a demultiplexer deduced from the prior art to demultiplex sixteen modulated carriers with identical bandwidths, would include delay lines in stage 104 written $z^{-0}$, $z^{-1}$, $z^{-2}$ and $z^{-3}$. In each polyphase network the paralleling of four delay lines which are linked respectively with digital filters deduced from an elementary low-pass filter (associated with the complex multiplying means of the Fourier transform) makes possible to obtain a frequency filter with a bandwidth $f_2/f_1 = 4$ times greater than the bandwidth of the elementary filter, so as to restore a modulated carrier of GROUP 2 with a bandwidth four times greater than the bandwidth of a carrier of GROUP 1 filtered by the elementary filter.

Delay lines $104_a$ to $104_d$ as shown in FIG. 7A in z transform model form, are in practice digital circuits on shift registers base and other basic digital components, which are clocked at a frequency equal to the initial sampling frequency 1/T. As seen previously, the initial frequency of the sequence of samples of the multiplexed modulated carriers on output from sampler 101 is reduced, by respective given factors, on the outputs of decimators $102_1'$ and $102_2'$. According to the frequency division of the carriers indicated in FIG. 7B, the switching circuits $103_1$ and $103_2$ interconnect the outputs of decimators $102_1'$ and $102_2'$ respectively to delay lines $104a$, $104b$ and $104c$, $104d$, precisely contingent on the respective reduced frequencies of the sequences of samples issued from two decimators $102_1'$ and $102_2'$ as compared to the initial sampling frequency. Thus, in practice, the switching means $103_1$ and $103_2$ selectively connect the outputs of decimators $102_1'$ and $102_2'$ to inputs of delay lines in stage 104 contingent on the frequencies of the sequences issued from said decimators, and hence the total bandwidth allocated to each group of multiplexed modulated carriers.

The delays conferred by the delay lines in stage 104 are programmed respectively depending on the reduced frequencies of the sequences that they receive throught the switching stage 103 as compared to the clock frequency of the delay lines (equal to the initial sampling frequency 1/T). Thus the delay of a sample of a sequence with frequency reduced by half, for the two groups, is equivalent to two sample periods of the sampled multicarrier signal given that the frequency of the reduced sequences is twice less than the sampling frequency. In the embodiment shown in FIG. 7A, two delay lines $104_a$ and $104_b$, $104_c$ and $104_d$ having $z^{-0}$ and $z^{-2}$ transfer functions are thus attributed to each group of carriers given that the two groups of carriers possess equal bandwidths.

The outputs of delay lines $104_a$ to $104_d$ are applied respectively to the four polyphase networks $105_a$ to $105_d$ independently of the up-links traffic.

All the outputs of filters Hp0 to Hp15 in the four polyphase networks $105_a$ to $105_d$ are applied to inputs of complex multiplying circuit $105_5$ whose 16 outputs are divided into two groups, eight outputs which are attributed to the eight base-band carriers of GROUP 1, and eight other outputs which are separated into two sets of four outputs which are attributed to the two base-band carriers of the second group GROUP 2, given that the carriers of GROUP 2 have bandwidths four times greater than the bandwidths of the carriers of GROUP 1. In circuit $105_5$, the complex multiplying digital computing performed for the sequences issuing from the branches of polyphase networks $105_a$ to $105_d$ is carried out by one (8×8) matrix means and four (2×2) matrix means.

The (8×8) matrix means receives the sequences issuing from filters Hp0 to Hp7 included in networks $105_a$ and $105_b$ and restores the eight digital channels of GROUP 1 corresponding to carriers P1/1 to P1/8 to eight first outputs of circuit $105_5$. This matrix means makes a digital computation deduced, in terms of transfer function, from a matrix of coefficients as defined above as a function of $V = \exp[-j2\pi/N]$, with $N=8$.

The division of the digital processing of the two carriers P2/1 and in GROUP P2/2 into four square matrix means in circuit $105_5$ results from the fact that each of the channels of GROUP 2 is equivalent to a juxtaposition of four elementary bandwidths $f_1$ and subsequently each set comprising two same elementary bandwidths in carrier channels P2/1 and P2/2 are correlated in stage 102.

Thus, each of the (2×2) matrix means is linked to the outputs of two respective filters in networks $105_c$ and $105_d$ which correspond to the same frequency base subband of width $f_1$ in the carrier channels and P2/1 and P2/2, i.e. receive digital sequences having undergone a same delay in networks $105_c$ and $105_d$.

A first (2×2) matrix means processes the sequences issuing from filters Hp8 and Hp12 preceded by delay lines $z^{-0}$ in networks $105_c$ and $105_d$ and so on for the three other (2×2) matrix means. The fourth and last (2×2) matrix means consequently processes the sequences issuing from filters Hp11 and Hp15 preceded by delay lines $z^{-12}$ in networks $105_c$ and $105_d$. Each of the (2×2) means makes use of a square coefficient matrix and restores a quarter of the bandwidth of the channels of carriers P2/1 and P2/2.

Figure 8A:
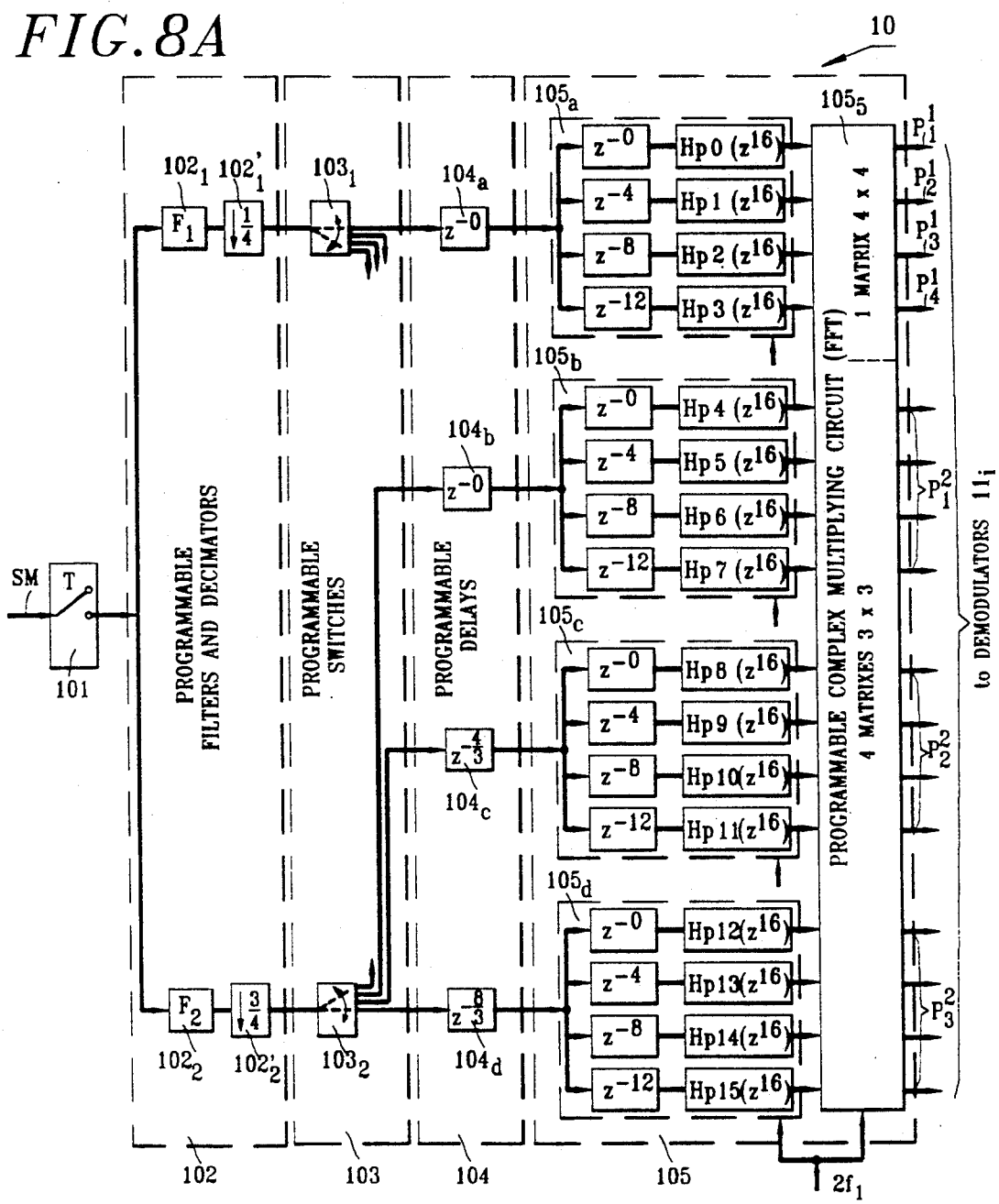
FIGS. 8A and 8B show respectively a second operating mode of the programmable demultiplexing device and a frequency image of a corresponding up-links traffic.
Figure 8B:
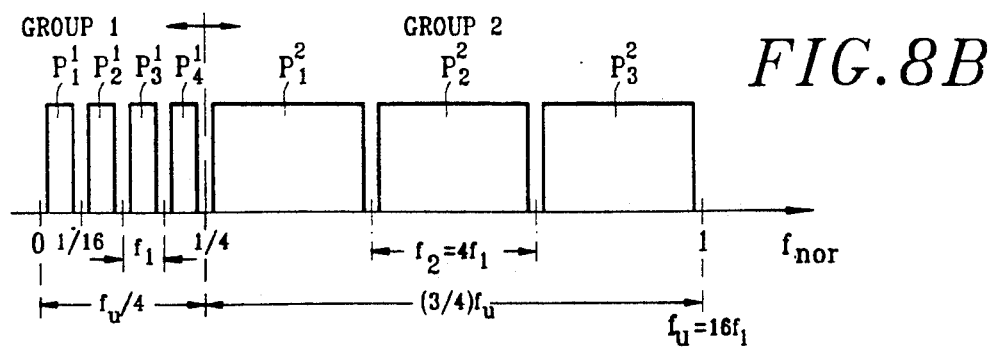

Referring to FIG. 8A, a second operating mode of demultiplexer 10 is shown, for an up-links traffic shown in FIG. 8B. According to this traffic, GROUP comprises four consecutive channels of modulated carriers P2/1 and P1/4 having a frequency bandwidth $f_1$, whereas GROUP 2 comprises three consecutive channels with carriers P2/1 and P2/3 having a frequency bandwidth $f_2 = 4f_1$. This second operating mode is in practice identical from the structural point of view to the first operating mode shown in FIG. 7A, and is different from the functional point of view, from that shown in FIG. 7A, owing to the programming of certain elements of multiplexer 10 depending on the division of the traffic. The programmable elements are filters $102_1$ and $102_2$, decimators $102_1'$ and $102_2'$, delay lines $104_a$ to $104_d$, and the matrix means in the complex multiplying circuit $105_5$. According to a preferred embodiment, the programming of these various elements is obtained by means of a control unit UC shown in FIG. 2, which receives all the characteristics of each new division of the traffic through the dedicated up-link LS.

In this second traffic configuration, filters $102_1$ and $102_2$ are programmed with bandwidths of $f_u/4$ and $3f_u/4$ to separate the two groups 1 and 2 which no longer have the same bandwidths than in the configuration in FIG. 7B. The reduction factors of decimators $102_1'$ and $102_2'$ are adjusted as a function of the new bandwidths $f_u/4$ and $3f_u/4$ and are equal to ¼ and ¾.

Concerning the delay lines in stage 104, these latter are programmed as a function of the new reduction factors. The first delay line $104_a$ still has a $z^{-0}$ transfer function given that polyphase network $105_a$ is still attributed to the processing of carriers P1/1 and P1/4. As three samples out of four of the multicarrier signal are to be processed at output of decimator $102_2'$, three delay lines $104_b$, $104_c$ and $104_d$ are connected to the output of decimator $102_2'$ through switching circuit $103_2$ whereof three outputs are used. Delay lines $104_b$, $104_c$ and $104_d$ respectively impose delays in the respective ratios of $(4\times0)/3$, $(4\times1)/3$ and $(4\times2)/3$ with sampling frequency $1/T$.

Complex multiplying circuit $105_5$ is then programmed in a 4×4) matrix means and four (3×3) matrix means. The (4×4) matrix means is connected to the outputs of filters Hp0 to Hp3 in polyphase network $105_a$ to restore carriers P1/1 and P1/4 of GROUP 1. The four (3×3) matrix means are connected respectively to the three-filters sets, Hp4-Hp8-Hp12, Hp5-Hp9-Hp13, Hp6-Hp10-Hp14 and Hp7-Hp11-Hp15 relating to the four subbands of width $f_1$ in the channels of the three carriers P2/1, P2/2 and P2/3i, so as to restore these channels.

What we claim is:

1. A device for demultiplexing frequency multiplexed channels in a multicarrier sampled signal having a predetermined useful frequency bandwidth, said frequency multiplexed channels being defined by respective modulated carriers included in said useful frequency bandwidth and by respective frequency bandwidths which are juxtaposed in said useful frequency bandwidth, the width of each one of said frequency bandwidths of the frequency multiplexed channels being (a) an integer sub-multiple of a maximum channel bandwidth which itself is a sub-multiple of said useful frequency bandwidth and (b) an integer multiple of a minimum channel bandwidth, said demultiplexing device comprising:

several digital filtering means for respectively separating said frequency multiplexed channels in said multicarrier sampled signal into channel groups in a predetermined number, each of said channel groups being defined by a group bandwidth and comprising frequency-juxtaposed channels among said frequency multiplexed channels having the same bandwidth which is different from the bandwidths of the channels in the other channel groups, several parallel delay lines in a predetermined number equal to a ratio between said useful frequency bandwidth and said maximum channel bandwidth, each of said channel groups being delayed by a number of respective parallel delay lines among said several delay lines equal to the nearest upper integer of a ratio between a bandwidth of said each of the channel groups and said maximum channel bandwidth, several parallel identical polyphase networks respectively connected to outputs of said parallel delay lines, each of said polyphase networks comprising several parallel delay line and digital filter combinations in a predetermined manner equal to a ratio between said maximum and minimum channel bandwidths, said parallel polyphase networks being in a predetermined number equal to the ratio between said useful frequency bandwidth and said minimum channel bandwidth, said digital filters included in said combinations being deduced from a digital low-pass filter filtering in said minimum channel bandwidth, and Fourier transform digital processing means connected to outputs of the digital filters of said respective parallel combinations to restore individually said channels.

2. The demultiplexing device of claim 1, wherein said several filtering means for separating said frequency multiplexed channels in said multicarrier sampled signal each comprises
a digital group filter having a bandwidth equal to the group bandwidth of one respective of said channel groups and a decimator series-connected to said digital group filter and having a reduction ratio equal to a ratio between said group bandwidth and said useful frequency bandwidth.

3. A demultiplexing device as claimed in claim 2, wherein said parallel delay lines among several delay lines delaying each of said channel groups impose delays respectively in proportion to integer multiples as from zero of a ratio between said useful frequency bandwidth and said group bandwidth of each of said channel groups.

4. A demultiplexing device as claimed in claim 1, wherein said delay lines included in each of said polyphase networks impose delays respectively in proportion to integer multiples as from zero of said ratio between said maximum and minimum channel bandwidths.

5. A demultiplexing device as claimed in claim 1, wherein said Fourier transform digital processing means comprise, for said each of the channel groups, several Fourier transform coefficient square matrix means in a number equal to a ratio between the bandwidth of the channels of said each of the channel groups and said minimum channel bandwidth, each of said matrix means having a dimension equal to a number of channels in said each channel group.

6. A demultiplexing device as claimed in claim 1, wherein said digital filtering means, said parallel delay lines and four Fourier transform digital processing means are programmed as a function of said predetermined number of channel groups within said useful frequency bandwidth and respective numbers of frequency-juxtaposed channels in said channel groups, and said demultiplexing device comprises several switching means respectively connected to outputs of said digital filtering means and controlled for connecting selectively said digital filtering means to said parallel delay lines as a function of said predetermined number of channel groups and said respective numbers of frequency-juxtaposed channels in said channel groups.

* * * * *